United States Patent
Yotsuya

(10) Patent No.: US 10,786,968 B2
(45) Date of Patent: Sep. 29, 2020

(54) INK SUPPLY TUBE PROVIDED WITH GAS BARRIER PROPERTIES

(71) Applicant: JUNKOSHA INC., Ibaraki (JP)

(72) Inventor: Masato Yotsuya, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 0 days.

(21) Appl. No.: 16/648,393

(22) PCT Filed: Sep. 19, 2018

(86) PCT No.: PCT/JP2018/034702
§ 371 (c)(1),
(2) Date: Mar. 18, 2020

(87) PCT Pub. No.: WO2019/059243
PCT Pub. Date: Mar. 28, 2019

(65) Prior Publication Data
US 2020/0262170 A1     Aug. 20, 2020

(30) Foreign Application Priority Data
Sep. 19, 2017  (JP) ................................ 2017-179483

(51) Int. Cl.
| | |
|---|---|
| *B41J 2/175* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/40* | (2006.01) |
| *F16L 11/12* | (2006.01) |
| *B32B 1/08* | (2006.01) |

(52) U.S. Cl.
CPC .............. *B32B 1/08* (2013.01); *B32B 27/28* (2013.01); *B32B 27/306* (2013.01); *B32B 27/32* (2013.01); *B32B 27/34* (2013.01); *B32B 27/40* (2013.01); *B41J 2/175* (2013.01); *F16L 11/12* (2013.01); *B32B 2307/7242* (2013.01); *B32B 2375/00* (2013.01); *B32B 2377/00* (2013.01); *B32B 2597/00* (2013.01)

(58) Field of Classification Search
CPC . B41J 2/175; B32B 1/08; B32B 27/28; B32B 27/306; B32B 27/32; B32B 27/34; B32B 27/40; F16L 11/12
See application file for complete search history.

(56) References Cited

U.S. PATENT DOCUMENTS

| | | | |
|---|---|---|---|
| 5,473,354 A * | 12/1995 | Arquilevich | B41J 2/175 347/85 |
| 5,895,797 A | 4/1999 | Hayashihara et al. | |
| 2005/0248633 A1 | 11/2005 | DeFosse et al. | |
| 2013/0174933 A1 * | 7/2013 | Yamakawa | B32B 1/08 138/137 |

FOREIGN PATENT DOCUMENTS

| | | |
|---|---|---|
| JP | H09-300652 A | 11/1997 |
| JP | H10-001579 A | 1/1998 |
| JP | H10-278289 A | 10/1998 |
| JP | 2007-307875 A | 11/2007 |
| JP | 2013-022918 A | 2/2013 |

OTHER PUBLICATIONS

Nov. 13, 2018, Written Opinion of the International Searching Authority issued for related PCT Application No. PCT/JP2018/034702.
Nov. 13, 2018, International Search Report issued for related PCT Application No. PCT/JP2018/034702.
Nov. 13, 2018, International Search Opinion issued for related PCT Application No. PCT/JP2018/034702.

* cited by examiner

*Primary Examiner* — Jason S Uhlenhake
(74) *Attorney, Agent, or Firm* — Paratus Law Group, PLLC

(57) ABSTRACT

The present invention has an object to provide an ink supply tube having an excellent stress crack resistance during sliding while having a high gas barrier property. According to the present invention, an ink supply tube is provided, which includes an inner layer contacting with an ink, an intermediate layer containing at least one layer, and an outer layer, wherein the intermediate layer is a gas barrier layer formed of an ethylene-vinyl alcohol copolymer resin, and an oxygen concentration within a circular region that has a diameter of 100 m and is centered at the gas barrier layer is 2 to 9 atm %.

8 Claims, No Drawings

INK SUPPLY TUBE PROVIDED WITH GAS BARRIER PROPERTIES

CROSS REFERENCE TO PRIOR APPLICATION

This application is a National Stage Patent Application of PCT International Patent Application No. PCT/JP2018/034702 (filed on Sep. 19, 2018) under 35 U.S.C. § 371, which claims priority to Japanese Patent Application No. 2017-179483 (filed on Sep. 19, 2017), which are all hereby incorporated by reference in their entirety.

TECHNICAL FIELD

The present invention relates to an ink supply tube having excellent a gas barrier property and slidability.

BACKGROUND ART

As a material requiring a high gas barrier property, for example, a laminate in which gas permeation is prevented by a metal thin film that is vapor-deposited with a metal, or the likes, is known (Patent Literature 1). However, when using a laminate in which the metal thin film is used as a gas barrier layer of a tube used in a sliding part, problems occur such that cracks are generated in the metal film during sliding to lower a gas barrier property and visibility inside the tube is lost. To maintain visibility of the tube, it is effective that the whole tube is constituted of a resin, and in the case where the tube is constituted of a resin, an ethylene-vinyl alcohol copolymer (EVOH) is widely used in a gas barrier layer.

EVOH is a resin having the highest gas barrier property in resins, but is very hard. Therefore, in the case where EVOH is used in a gas barrier layer of a tube or the like that is used in a repeatedly sliding part, there is a problem such that cracks are easily to be generated. When cracks are generated in EVOH, a gas permeates from the cracked parts and as a result, a barrier performance remarkably deteriorates. For this reason, to enhance flexibility of EVOH, for example, a method of adding additives is attempted, but a barrier property deteriorates by the addition of additives (Patent Literature 2).

CITATION LIST

Patent Literature

Patent Literature 1: JP-A-2013-22918
Patent Literature 2: JP-A-10-1579

SUMMARY OF INVENTION

Technical Problem

An object of the present invention is to provide a tube in which a gas barrier property does not deteriorate even after sliding, while having a high gas barrier property.

Solution to Problem

The present inventors have found that a laminated tube in which an oxygen concentration within a circular region that has a diameter of 100 μm and is centered at a gas barrier layer is 2 to 9 atm %, has an excellent gas barrier property and slidability, and have completed the present invention.

Specifically, the present invention is as follows.

[1] An ink supply tube having a gas barrier property, comprising an inner layer contacting with an ink, an intermediate layer and an outer layer, wherein the intermediate layer is a gas barrier layer formed of an ethylene-vinyl alcohol copolymer resin, and an oxygen concentration within a circular region that has a diameter of 100 μm and is centered at the gas barrier layer is 2 to 9 atm %.

[2] The ink supply tube described in [1] above, wherein an ethylene composition rate of the ethylene-vinyl alcohol copolymer resin constituting the gas barrier layer is 25 to 45 mol %.

[3] The ink supply tube described in [1] or [2] above, wherein a variation of the oxygen concentration on a cross-section in a radial direction is 25% or less.

[4] The ink supply tube described in any one of [1] to [3] above, wherein a variation of the oxygen concentration on a cross-section in a longitudinal direction is 10% or less.

[5] The ink supply tube described in any one of [1] to [4] above, wherein a ratio of a thickness of the gas barrier layer to a thickness of the ink supply tube is 1 to 25%.

[6] The ink supply tube described in any one of [1] to [4] above, wherein a thickness of the gas barrier layer is 0.01 to 0.10 mm.

[7] The ink supply tube described in any one of [1] to [6] above, wherein a material of the inner layer is selected from a group consisting of a fluororesin, a polyolefin, and a mixture thereof.

[8] The ink supply tube described in any one of [1] to [7] above, wherein a material of the outer layer is selected from the group consisting of a polyolefin elastomer, a polyamide elastomer, a polyurethane elastomer, a polyolefin resin, a polyamide resin, and mixtures thereof.

Advantageous Effects of Invention

According to the present invention, a tube in which a stress crack resistance during sliding is excellent while having a high gas barrier property and a gas barrier property is difficult to deteriorate even after sliding, can be provided.

DESCRIPTION OF EMBODIMENTS

Embodiments for carrying out the present invention are described in detail below. The following embodiments are exemplifications for explaining the present invention and the present invention is not construed as being limited to the following contents. The present invention can be carried out by appropriately modifying within the scope of the gist thereof.

The ink supply tube of the present invention is a hollow tube constituted of a plurality of layers in a thickness direction. The plurality of layers includes an outer layer, an intermediate layer and an inner layer from the outside. A molding of the tube of the present invention can be carried out by a method comprising molding a single layer tube or a multilayered tube and winding the tube, passing the tube through a mold (die) of an extruder, and laminating a resin extruded from the mold on the tube. Furthermore, to further strongly adhere layers, the tube can be molded by a method (coextrusion) of simultaneously melt-extruding each layer and laminating the layers inside the die or in the vicinity of the die, using a plurality of extruders according to the number of layers. To prevent cracks in EVOH layer when sliding the tube, it is effective to increase adhesive strength between the EVOH layer as a gas barrier layer and the inner layer or the outer layer, thereby suppressing peeling of the EVOH layer. For this reason, the tube of the present invention is preferably molded by coextrusion. In molding by coextrusion, in the case of thinning the gas barrier layer as the intermediate layer sandwiched between the inner layer and the outer layer as compared with the other layers, the intermediate layer is greatly influenced by a resin pressure of the inner layer and outer layer and it is difficult to constantly control a resin pressure and discharge of the intermediate resin layer itself with a high accuracy. Conventional tubes had the problems such that when thinning the intermediate layer, the resin does not uniformly flow in a mold, and in a cross-section vertical to a longitudinal direction of the tube, one or more thinner parts are generated in the thickness of the intermediate layer. Similarly, the thickness in a longitudinal direction also was not uniform due to that the discharge of the intermediate layer is unstable. It is considered that the nonuniform thickness of the intermediate layer is one of the causes that induce cracks in the EVOH layer when sliding the tube. In order to make a resin pressure of the intermediate layer during extrusion molding to be equivalent to a resin pressure of the inner layer and outer layer to suppress nonuniformity of the thickness of the intermediate layer, thereby, the tube of the present invention was molded while stabilizing a resin pressure of the intermediate layer by sending out a resin melted inside a cylinder by a screw and then bypassing and removing a part of a molten resin just before entering the mold. Furthermore, the tube was molded while measuring a thickness of the intermediate layer of the molded tube at a position near the exit of the mold with a sensor utilizing ultrasonic waves, feedbacking to an extruder and adjusting the thickness of the intermediate layer on line. By this, a tube having uniform thickness of the intermediate layer can be obtained. After molding, to remove residual strain of each layer of the tube, the tube may be subjected to an annealing treatment at a temperature equal to or lower than the lowest melting point in the resins constituting the tube.

(Outer Layer)

In the present invention, a layer to be provided outside the EVOH layer as a gas barrier layer is the outer layer. A material of the outer layer may be a resin as a protective layer which has an excellent fusing property to the intermediate layer and further giving a bending property to the whole tube, for example, a polyolefin resin, a polyamide resin, a polyethylene resin or a polyurethane resin. To enhance flexibility of the tube, an elastomer is preferred. As the polyolefin resin, an acid-modified polyolefin resin having adhesiveness to an ethylene-vinyl alcohol copolymer resin (EVOH) described hereinafter can be used. For example, a copolymer (random copolymer, block copolymer, graft copolymer or the like) of an olefin such as ethylene or propylene and other monomer(s), and a polymer alloy containing an olefin as a main component can be used. More specifically, the commercially available MODIC F534A (manufactured by Mitsubishi Chemical Corporation) may be used as the outer layer. The thickness of the outer layer can be appropriately determined depending on a tube size and a thickness of the whole, and is, for example 0.1 to 2.0 mm and more preferably 0.2 to 1.6 mm.

(Intermediate Layer)

In the present invention, the intermediate layer means a gas barrier layer as described before. Typically, the intermediate layer is formed of an ethylene-vinyl alcohol copolymer resin (EVOH) having the highest oxygen barrier property in the resins. The "gas barrier layer", when used in the present specification, is a layer that suppresses a gas that affects quality of an ink, such as oxygen, nitrogen, carbon dioxide and water vapor in the air from permeating from the outside of a substrate. According to the present invention, when an oxygen permeability is used as the measure, for example, a layer having oxygen permeability at a temperature of 20° C. and a relative humidity of 65% of 0.01 to 4.0 $cc/(m^2 \times day \times atm)$ can be used as the gas barrier layer. The oxygen permeability is obtained by measuring a permeation rate of oxygen permeating a film using a coulometric sensor, and is measured by a method defined in ISO 14663-2:1999 (Annex C). The film to be measured preferably has the same thickness as that of the gas barrier layer, but the gas permeability of the film can be measured by converting the thickness of the film into the same thickness of the gas barrier film by calculation. The "atm" in the gas permeability is a pressure under an environment at a temperature of 20° C. and relative humidity of 0%. After the tube of the present invention having such a gas barrier layer is allowed to stand in the environment of a temperature of 35° C. and a relative humidity of 80% for 500 hours, the content of dissolved oxygen in the degassed water enclosed in the tube as measured at room temperature can be 7.0 mg/L or less.

The EVOH has many hydroxyl groups in the molecule and therefore, a free volume size in the molecule is small due to hydrogen bonds between hydroxyl groups, and oxygen molecules are difficult to permeate. However, the EVOH does not have a flexibility due to the hydrogen bonds, and when used in a sliding part, cracks are easy to be generated. Furthermore, water molecules is adsorbed on hydroxyl groups of EVOH, the water molecules form a cluster and are adsorbed, and a free volume size in the molecule becomes a size (3.5 angstroms) of an oxygen molecule or more, thereby oxygen permeates. In the present invention, the EVOH is not particularly limited so long as it is EVOH having the above described properties. The commercially available EVOH DC3212. E3808 and A4412 (manufactured by The Nippon Synthetic Chemical Industry Co., Ltd., trade name "SOARNOL (trademark)"), F171B, H171B and E105B (manufactured by Kuraray Co., Ltd., trade name "EVAL (trademark)"), and the like may be used.

In the present invention, when EVOH is used as the gas barrier layer, a flexibility of the resin increases and a gas barrier property decreases, with increasing an ethylene composition rate. On the other hand, a gas barrier property increases and a flexibility of the resin decreases, with decreasing the ethylene composition rate. In the present invention, the ethylene composition rate is preferably less than 45 mol %. For example, 25 to 45 mol % is exemplified as the ethylene composition rate. Furthermore, when the thickness of the EVOH layer is decreased, stress applied to the EVOH resin when sliding can be reduced, and to enhance crack resistance, it is effective to decrease the thickness of the EVOH layer. On the other hand, to maintain a gas barrier property, it is considered that a certain thickness or more of the EVOH layer is necessary, and the necessary thickness varies depending on the ethylene composition ratio. It is considered that hydroxyl groups give all of the above influences. The range suitable to achieve both a gas barrier property and crack resistance during sliding is narrow, and an oxygen concentration can be determined as an index in place of hydroxyl groups in order to specify the range. The oxygen concentration is not limited, and can be measured using a circle having a diameter of 100 μm and being centered at the EVOH layer as an observation field, using, for example, energy dispersive X-ray analysis (EDX). In the present invention, the oxygen concentration in the observation field is preferably 2 to 9 atm % and more preferably 4 to 9 atm %. The inner layer and outer layer included in the observation field together with the EVOH layer have an oxygen concentration lower than the oxygen concentration of the EVOH layer. The oxygen concentration is indicated as an element ratio among the 4 elements of F, C, O and Cl measured, using EDX.

Variations of the oxygen concentrations on the cross-section in the radial direction and on the cross-section in a longitudinal direction, of the tube can be measured using the EDX as described above. In the present invention, the variation of the oxygen concentration on the cross-section in the radial direction is preferably 25% or less. On the other hand, the variation of the oxygen concentration on the cross-section in the longitudinal direction is preferably 10% or less. When the oxygen concentration is no more than those numerical values, an excellent crack resistance can be given to the tube. The thickness of the intermediate layer can be appropriately determined depending on the thickness of the whole tube, and is, for example, 0.01 to 0.1 mm and more preferably 0.02 to 0.10 mm. The thickness is still more preferably 0.02 to 0.05 mm. Alternatively, the thickness of the intermediate layer, for example, the gas barrier layer, is preferably 1 to 25% and more preferably 3 to 15%, as compared with the thickness of the whole tube.

[Inner Layer]

In the present invention, a layer provided inside the EVOH layer as the gas barrier layer is defined as an inner layer. The inner layer desirably has a high gas barrier property similar to the intermediate layer. Additionally, the inner layer brings into contact with an ink and is therefore preferably resistant to various solvents. A material having such properties can include a fluororesin, and tetrafluoroethylene-perfluoro(alkyl vinyl ether)-chlorotrifluoroethylene copolymer (CPT) that is a modified perfluoroalkoxy resin having particularly a high barrier property is preferably used. When the CPT is provided as the inner layer, since EVOH of the intermediate layer is not exposed to water, this is very effective. In the present invention, CPT is not limited so long as it has the above-described properties, and the commercially available NEOFLON CPT LP-1000 (manufactured by Daikin Industries, Ltd.) and the like may be used. The thickness of the inner layer can be appropriately determined depending on the thickness of the whole tube, and is, for example, 0.05 to 0.5 mm and more preferably 0.05 to 0.3 mm.

As described above, the laminated tube of the present invention has a characteristics having not only a high gas barrier property but also an excellent crack resistance. As described in the examples described hereinafter, it is understood that the number of slidings until the generation of cracks is confirmed well exceeds 8,000,000.

The present invention is further specifically described by the following examples, but the present invention is not construed as being limited to those examples.

Examples

As shown in Table 1, various laminated tubes constituted of an inner layer, an intermediate layer (gas barrier layer) and an outer layer were prepared. Oxygen concentration of respective tubes was measured, and the respective tubes were subjected to an oxygen permeation test and a sliding test.

(1) Molding of Various Laminated Tubes

Three-layered tubes were molded by coextrusion using an extrusion molding machine manufactured by Tanabe Plastics Machinery Co. Ltd. Trifluoroethylene copolymer (CPT) (manufactured by Daikin Industries, Ltd. NEOFLON CPT LT-1000) as an inner layer was melted at a cylinder temperature of 310° C., an ethylene-vinyl alcohol copolymer resin (EVOH) (SOARNOL manufactured by The Nippon Synthetic Chemical Industry Co., Ltd., or EVAL manufactured by Kuraray Co., Ltd.) as an intermediate layer (gas barrier layer) was melted at a cylinder temperature of 230° C., and (MODIC F534F manufactured by Mitsubishi Chemical Corporation, ADMER manufactured by Mitsui Chemicals, Inc. or PEBAX manufactured by ARKEMA) as an outer layer was melted at a cylinder temperature of 190° C. Those molten resins were laminated in a mold at a temperature of 310° C. and were extruded. The outer diameter thereof was controlled by a former, and a cooling was performed. As a result, respective laminated tubes each having an outer diameter of 4 mm and an inner diameter of 3 mm were obtained. Configuration and thickness of each layer of the tubes of each example and comparative example are shown in Table 1.

TABLE 1

| | Configuration | | | Size (mm) | | |
|---|---|---|---|---|---|---|
| | Material of inner layer | Material of gas barrier layer | Material of outer layer | Thickness of inner layer | Thickness of gas barrier layer | Thickness of outer layer |
| Example 1 | CPT LP-1000 | EVOH E3808 | MODIC F534A | 0.12 | 0.02 | 0.36 |
| Example 2 | CPT LP-1000 | EVOH A4412 | MODIC F534A | 0.12 | 0.05 | 0.33 |
| Example 3 | CPT LP-1000 | EVOH F171B | MODIC F534A | 0.15 | 0.06 | 0.29 |
| Example 4 | CPT LP-1000 | EVOH E105A | ADMER LB548 | 0.15 | 0.04 | 0.31 |
| Example 5 | CPT LP-1000 | EVOH H171B | PEBAX 35R53 | 0.12 | 0.10 | 0.28 |
| Comparative Example 1 | CPT LP-1000 | EVOH E3808 | MODIC F534A | 0.12 | 0.10 | 0.26 |

(2) Measurement of Oxygen Concentration

Oxygen concentration on a tube cross-section of the tube was measured by energy dispersive X-ray analysis (EDX). Portable microscope Miniscope (registered trademark) TM3030 Plus manufactured by Hitachi High Technologies Corporation was used in the measurement. Tube was cooled with liquid nitrogen and vertically cut in a longitudinal direction of the tube to prepare a cross section. The measurement was performed using a circle having a diameter of 100 μm and being centered at the gas barrier as the measurement range. The measurement was conducted under accelerated voltage: 15 kV, degree of vacuum: 50 Pa and observation magnification: 1000. The center of the circle as the measurement range was set so as to consist with the center of the thickness of the gas barrier layer, and an area of the gas barrier layer in the measurement range was set so as to become as large as possible. Elements to be measured by EDX are F, C, O and Cl, and their ratios automatically calculated by the program that came with the microscope were employed. The measurement was conducted at 6 places or more on the same cross-section, and their average value was used as an oxygen concentration. In the measurement on the same cross-section, a maximum value and a minimum value were determined and those values were used as a maximum oxygen concentration and a minimum oxygen concentration, respectively. The variation in a radial direction of the oxygen concentration was calculated using the following equation:

(Maximum oxygen concentration−minimum oxygen concentration)/(oxygen concentration)=

(Variation in radial direction of oxygen concentration)×100(%)

Similarly, oxygen concentration was measured at 8 places or more in a longitudinal direction, and a maximum value and a minimum value were determined among the values measured, and the variation in a longitudinal direction of the oxygen concentration was calculated using the above equation. The results are shown in Table 2 below.

(3) Oxygen Permeation Test

To remove a gas adsorbed on an inner layer, degassed water was enclosed in a tube cut into 500 mm and both edges of the tube were sealed. The tube was allowed to stand in a thermostat chamber of 50° C. for 12 hours, and the temperature was then decreased to room temperature. When the temperature of the tube had been reached to room temperature, the enclosed water was discharged and degassed water was again enclosed in the tube, and the tube was sealed.

Thereafter, oxygen permeability was evaluated using the tube having a length of 500 mm from which the gas adsorbed on the inner surface was removed. Degassed water was enclosed in the tube, and the tube was allowed to stand in an environment of 35° C. and 80% RH for 500 hours. After 500 hours, dissolved oxygen in the degassed water enclosed in the tube was measured at room temperature (23 to 26° C.) using a dissolved oxygen meter. When the content of dissolved oxygen after 500 hours was 7.0 mg/L or less, it was designated as "OK". The results are shown in Table 2 below.

(4) Sliding Test

A tube was cut into a size of 600 mm, and both ends of the tube were set to joints of a testing apparatus. The tube was set such that the inner interval of the tube set to joints was 65 mm (bending R 65 mm), and the tube was slid with a sliding cycle of 120/minutes. The whole tube was visually observed every 1,000,000 times and the generation of cracks was confirmed. The test was conducted with n=6, and when the generation of cracks was confirmed in at least one tube, the test was completed. The number of slidings that was confirmed just before the completion of the test was used as the number of slidings. The results are shown in Table 2.

TABLE 2

|  | Oxygen concentration [atm %] | Variation in radial direction of oxygen concentration [%] | Variation in longitudinal direction of oxygen concentration [%] | Oxygen permeation test | Number of sliding [×10,000 times] |
|---|---|---|---|---|---|
| Example 1 | 4.2 | 22 | 7 | OK | 1000 |
| Example 2 | 5.8 | 28 | 5 | OK | 800 |
| Example 3 | 6.54 | 18 | 4 | OK | 900 |
| Example 4 | 4.87 | 8 | 6 | OK | 900 |
| Example 5 | 8.2 | 10 | 8 | OK | 800 |
| Comparative Example 1 | 9.8 | 43 | 11 | OK | 300 |

The tubes of Examples 1 to 5 in which the oxygen concentration was within a range of 2 to 9 atm % and the variation of oxygen concentration was suppressed small could achieve crack resistance while maintaining an oxygen barrier property. On the other hand, in the tube of Comparative Example 1, oxygen concentration was too high and crack resistance deteriorated. Furthermore, since the variation of oxygen concentration was large, crack resistance deteriorated.

INDUSTRIAL APPLICABILITY

The ink supply tube of the present invention has both an oxygen barrier property and crack resistance, shows a very high "Number of Sliding" and thus is stable. Therefore, the ink supply tube is not limited to a household printer, but is suitable in the uses of suppling an ink provided in industrial and commercial printers. Furthermore, the ink supply tube is suitable for use in various production apparatus using a printing system, such as organic EL material, UV curing paint and adhesive.

All the publications and patent documents cited in the present specification are incorporated herein by reference in their entities. Although the specific embodiments of the present invention has been described in the present specification for the purpose of exemplification, it is apparent to one skilled in the art that various modifications or changes can be made without departing the spirit and scope of the present invention.

The invention claimed is:

1. An ink supply tube having a gas barrier property, comprising an inner layer contacting with an ink, an intermediate layer and an outer layer, wherein the intermediate layer is a gas barrier layer formed of an ethylene-vinyl alcohol copolymer resin, and an oxygen concentration within a circular region that has a diameter of 100 μm and is centered at the gas barrier layer is 2 to 9 atm %.

2. The ink supply tube according to claim 1, wherein an ethylene composition rate of the ethylene-vinyl alcohol copolymer resin constituting the gas barrier layer is 25 to 45 mol %.

3. The ink supply tube according to claim 1, wherein a variation of the oxygen concentration on a cross-section in a radial direction is 25% or less.

4. The ink supply tube according to claim 1, wherein a variation of the oxygen concentration on a cross-section in a longitudinal direction is 10% or less.

5. The ink supply tube according to claim 1, wherein a ratio of a thickness of the gas barrier layer to a thickness of the ink supply tube is 1 to 25%.

6. The ink supply tube according to claim 1, wherein a thickness of the gas barrier layer is 0.01 to 0.10 mm.

7. The ink supply tube according to claim 1, wherein a material of the inner layer is selected from a group consisting of a fluororesin, a polyolefin, and a mixture thereof.

8. The ink supply tube according to claim 1, wherein a material of the outer layer is selected from the group consisting of a polyolefin elastomer, a polyamide elastomer, a polyurethane elastomer, a polyolefin resin, a polyamide resin, and mixtures thereof.

\* \* \* \* \*